United States Patent [19]

Berends

[11] 3,813,114
[45] May 28, 1974

[54] INVERTED FIFTH WHEEL COUPLER
[75] Inventor: Howard P. Berends, Fruitport, Mich.
[73] Assignee: Holland Hitch Company, Holland, Mich.
[22] Filed: May 30, 1972
[21] Appl. No.: 257,590

[52] U.S. Cl. ............................................. 280/434
[51] Int. Cl. ........................................... B62d 53/12
[58] Field of Search........ 280/423, 434, 435, 438 R, 280/433

[56] References Cited
UNITED STATES PATENTS

| | | | |
|---|---|---|---|
| 2,096,282 | 10/1937 | Kortering | 280/435 R |
| 2,142,748 | 1/1939 | Fontaine | 280/434 R |
| 2,179,708 | 11/1939 | Bock | 280/435 X |
| 2,212,708 | 8/1940 | Fraser | 280/435 R |
| 2,553,959 | 5/1951 | Cook et al. | 280/405 R |
| 2,656,195 | 10/1953 | Martin | 280/438 R |
| 3,485,513 | 12/1969 | Walther | 280/435 R |
| 3,578,357 | 5/1971 | Bouman et al. | 280/434 R |

Primary Examiner—David Schonberg
Assistant Examiner—Randall A. Schrecengost
Attorney, Agent, or Firm—Price, Heneveld, Huizenga & Cooper

[57] ABSTRACT

A fifth wheel employing a single control handle for unlocking the locking jaws of the fifth wheel and cocking a kingpin tripping mechanism, is mounted in an inverted position on a vehicle to be towed. A kingpin is mounted to a flat surface of a towing vehicle such that the kingpin can be coupled in locked engagement with the inverted fifth wheel.

16 Claims, 14 Drawing Figures

INVERTED FIFTH WHEEL COUPLER

BACKGROUND OF THE INVENTION

The present invention relates to a method of coupling two vehicles by employing an inverted fifth wheel, and to an improved fifth wheel assembly.

Recently, recreational vehicles such as camper trailers and the like, have been coupled to towing vehicles by using a fifth wheel coupler similar in general construction to the heavier fifth wheel assemblies employed to haul semi trailers. U.S. Pat. No. 3,578,357 assigned to the present assignee describes a fifth wheel which can be mounted in an upright position in the bed of a pickup truck to allow a trailer having a downwardly extending kingpin to be coupled to the pickup truck. Although such a coupling arrangement provides satisfactory performance and is considerably stronger and safer in operation than a conventional ball type hitch, the fifth wheel assembly positioned in the truck bed reduces the useful space within the truck bed and is relatively bulky. If the fifth wheel is removably mounted to the truck bed, brackets for mounting the fifth wheel must be securely bolted or welded to the truck and remain when the fifth wheel is removed, thereby consuming usable space. Also, the fifth wheel is relatively cumbersome to handle and therefore difficult to remove easily.

Thus while the use of a fifth wheel for towing recreational vehicles provides some advantages in safety and ability to handle larger trailer vehicles, the fifth wheels employed have been removably attached to the towing vehicle, thereby either reducing useful space in the vehicle (as, for example, when a bed of the pickup truck is employed) or relatively cumbersome to install or remove from the towing vehicle.

SUMMARY OF THE PRESENT INVENTION

The method and apparatus of the present invention however, overcome the remaining difficulties when employing a fifth wheel assembly for use in hauling recreational or other lightweight vehicles such as stock trailers, horse trailers, flatbed trailers, etc., by providing a fifth wheel which is mounted to the vehicle to be towed in an inverted position and placing only the kingpin on the towing vehicle. Since the kingpin takes up considerably less space than does the fifth wheel, it can be permanently attached to the towing vehicle without seriously interfering with nontowing uses of the vehicle. Alternately, as described herein and in detail in a copending application entitled "Kingpin Assembly" filed in the name of Howard Berends on even date herewith and assigned to the present assignee; the kingpin can be designed to pivot completely out of the way during nonuse.

In addition to providing an improved method of coupling two vehicles which provides greater convenience for the user, coupling the fifth wheel in an inverted position to the vehicle to be towed improves the hauling characteristics. This results since the articulation axis of the fifth wheel is, in one embodiment of the invention, positioned behind the kingpin such that when the towing vehicle negotiates a turn, the weight of the towed vehicle is directed toward the inside of the turn and tends to counteract the centrifugal forces tending to push the rear end of the towing vehicle toward the outside of the corner. Also, in the preferred embodiment of the fifth wheel of the present invention, the articulation axis of the fifth wheel remains parallel to the axis of the towed vehicle such that the front of the towed vehicle is stabilized against conventional fifth wheel articulation.

The fifth wheel itself is designed to provide automatic and positive locked coupling for safety. A single, double-acting control handle provides ease of operation in decoupling the vehicle and locking the coupling jaws during use.

It is an object of the present invention therefore, to provide a novel method of coupling a towing vehicle to a towed vehicle.

It is still an additional object of the present invention to provide a fifth wheel assembly having a single control handle providing jaw locking and opening functions.

It is still a further object of the present invention to provide a fifth wheel positioned on a towed vehicle in an inverted position and in a pivotable fashion to provide ease of coupling to the kingpin of the towing vehicle.

Another object of the present invention is to provide automatically releasable jaws which are self-locking.

These and other objects of the present invention will become apparent upon reading the following description and the accompanying drawings.

DETAILED DESCRIPTION OF THE DRAWINGS

Figure 1:
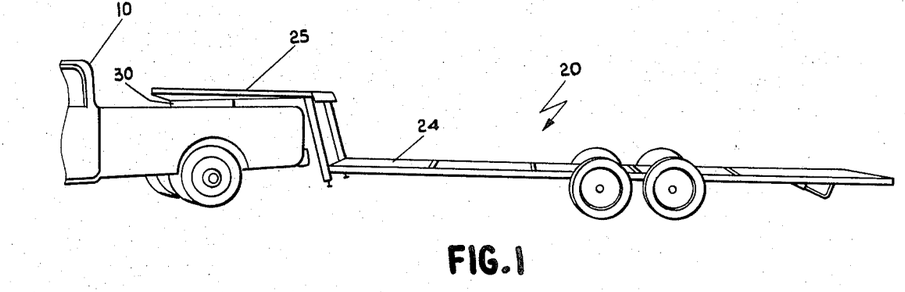
FIG. 1 is a fragmentary perspective view showing a trailer incorporating an inverted fifth wheel assembly embodying the present invention and coupled to a pickup truck by means of a kingpin mounted to the bed of the pickup truck.
Figure 7:
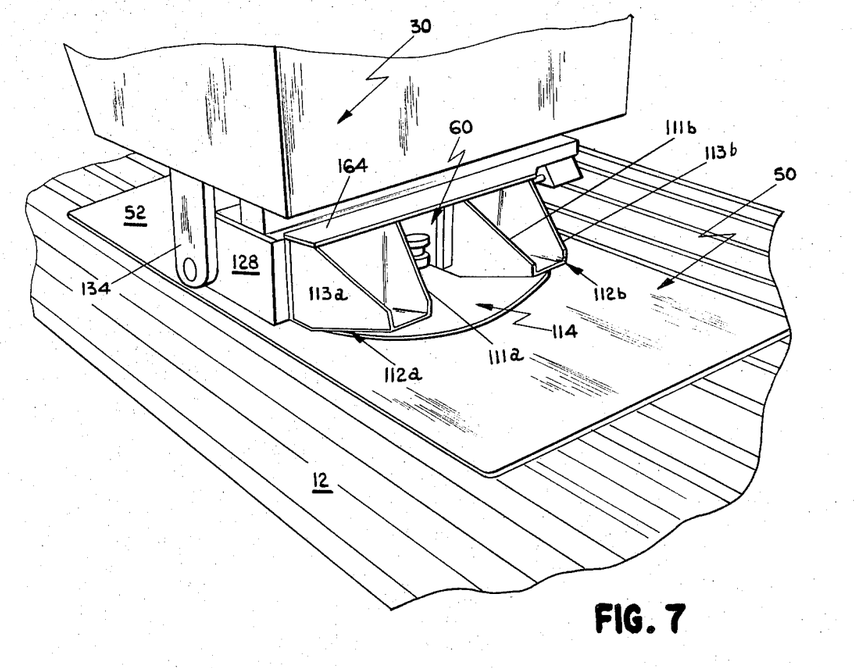
FIG. 7 is a front perspective view showing the fifth wheel as it is moving toward the kingpin mounted in the bed of the truck.

Referring now to the figures, there is shown in FIG. 1 a pickup truck 10 having a bed portion 12 (FIG. 7) with a foldaway kingpin assembly 50 mounted to the bed 12 of the truck. The kingpin assembly 50 includes a kingpin 60 therein which extends upwardly to couple to the fifth wheel as shown in FIG. 7. A trailer 20 having a horn or gooseneck portion 25 which is elevated from the trailer bed 24 and extends forwardly thereof includes a downwardly depending fifth wheel mounting box 30 thereon as shown in FIG. 1 and FIGS. 3 through 7. The flatbed trailer can be used as such, or any type of superstructure may be thereon such as a suitable camping or travel trailer or the like mounted to bed 24 of trailer 20.

Attached to the bottom surface 31 of the fifth wheel mounting box 30 is a fifth wheel assembly 100. As seen in the figures, the fifth wheel assembly 100 includes a bifurcated fifth wheel plate 110 having a bottom contact surface or face 115, an opposite surface 117, and a pair of forwardly extending frontal segments 112a and 112b. Segments 112a and 112b include tapered inner side walls 111a and 111b respectively defining a tapered kingpin guiding and receiving slot 114 therebetween. Segments 112a and 112b also include tapered outer side walls 113a and 113b and bottom surfaces 116a and 116b respectively.

Figure 8:
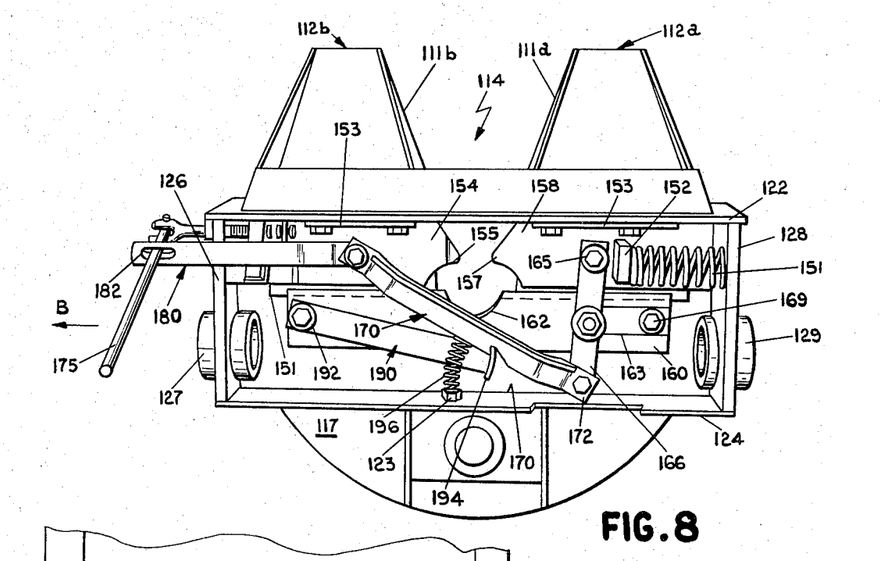
FIG. 8 is a plan view of the inverted fifth wheel showing the kingpin locking jaws in an unlocked position and held in place in this position by the kingpin tripping mechanism.

The fifth wheel plate 110 is fixedly mounted to a support member 120 including front and rear walls 122 and 124 and side walls 126 and 128 (FIG. 8). The support member 120 is pivotally mounted between arms 132, 134, and 136, 138 which depend downwardly from a cross member 131 of a mounting bracket 130 (FIGS. 2 and 3) by means of pivot pins 133 and 135. Pins 133 and 135 extend between apertures 127 and 129 mounted through the side walls 126 and 128 respectively of the support member 120; and through apertures 139 in inner arms 136, 138. Pins 135, 133 are held in place relative to the arms by suitable set screws (not shown). This arrangement therefore permits the fifth wheel plate 110 to articulate with respect to the mounting bracket 130 which is secured to the bottom surface 31 of the fifth wheel mounting box 30.

Figure 5:
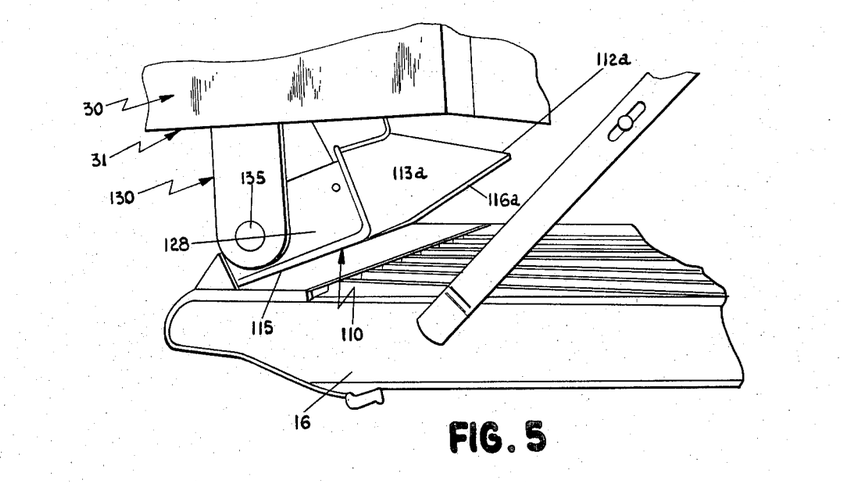
FIG. 5 is a fragmentary perspective view of the fifth wheel and its angular relationship to the bed of the pickup truck as it initially contacts the tailgate of the truck during the coupling operation.

The face surface 115 of the fifth wheel plate 110 is biased in an upwardly-forwardly tilted position as shown in FIG. 5 by means of a compression spring 140 which is held in place between an L-shaped member 147 on the mounting bracket (FIG. 2), and cross plate 144 which extends between a pair of ribs 146a and 146b (FIG. 3) on the fifth wheel plate 110 by means of studs 148. By so biasing the fifth wheel plate 110, the coupling of the trailer 20 to the truck 10 is facilitated since the upwardly tapered bottom surfaces 116a and 116b of the forward segments 112a and 112b of the fifth wheel plate and the surface 115 are elevated as shown in FIG. 5 and the truck can be backed under the fifth wheel assembly with relative ease. As the truck tailgate 16 (FIG. 5) contacts the surface 115 of the plate 100, the fifth wheel will rotate into a plane parallel to that of the truck bed and the kingpin 60 will be guided into slot 114 between the segments 112a and 112b as shown in FIG. 7.

Figure 10:
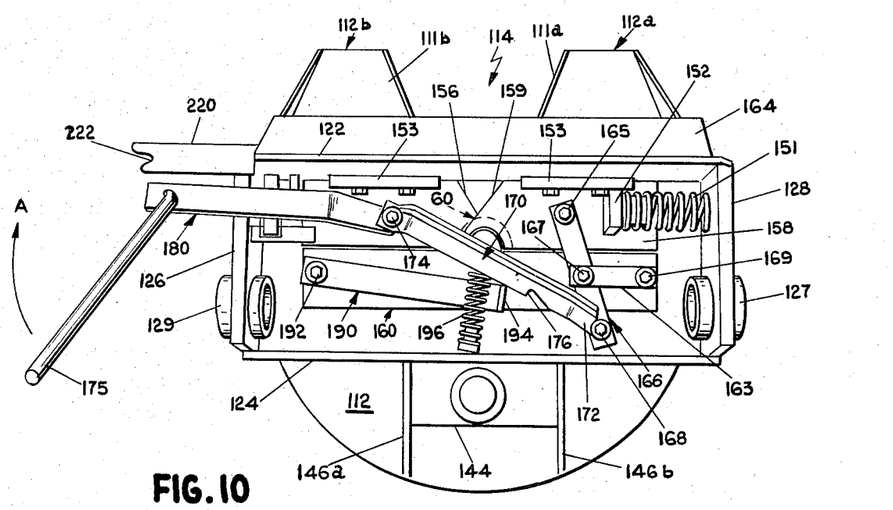
FIG. 10 is a plan view of the inverted fifth wheel assembly with the locking jaws in their locked position and the kingpin trip arm released.

Having described the mounting of the fifth wheel plate 110 onto the horn 25 of trailer 20 by means of the mountng box 30, a description of the locking mechanism incorporated in the fifth wheel support 120 to securely lock the kingpin into a coupled position will now be discussed. Referring to FIGS. 8 through 11, the kingpin locking mechanism 150 includes a pair of locking jaws 154 and 158 which are positioned in a slidable engagement within the support member 120 by means of a pair of retention bars 153 on one side of the jaws 154 and 158 and a sliding track 161 formed in the seating member 160, and which overhangs the locking jaw plates 154 and 158 slightly, thereby holding the sliding plates between the forward wall 122 of the support member 120 and the seating member 160. A compression spring 151 is mounted between wall 128 and jaw 158 by means of suitable holding studs such as stud 152 on jaw 158. Spring 151 is normally under compression to hold the jaws in a fully closed position (FIG. 10).

Figure 12:
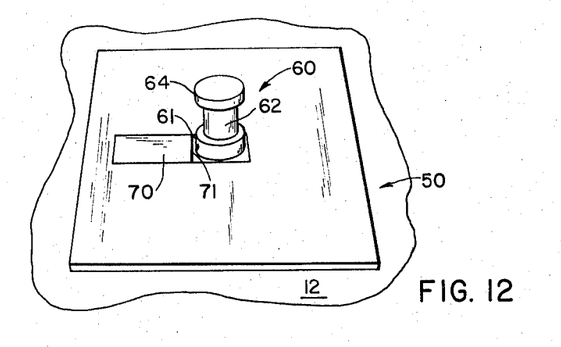
FIG. 12 is a perspective view of a fold-away kingpin assembly shown with the kingpin in an upright position.

A more detailed description of the jaws and their transversely slidable mounting relationship to the fifth wheel plate is presented in U.S Pat. No. 3,578,357 which is incorporated by reference herein. The seating member or engaging plate 160 is securely attached to the opposite surface 117 of the fifth wheel plate 110 as by welding. Plate 160 includes a semicircular aperture 162 which is adapted to receive the annular recessed portion 62 of the kingpin 60 (FIG. 12). The locking jaws 154 and 158 include beveled edges 155 and 157 which allow them to overlap somewhat to fully circumscribe the kingpin when in a locked position as shown in FIG. 10. In FIG. 10, the kingpin is shown in phantom form to illustrate the overlapping engagement of the locking jaws therewith.

The kingpin, which in the preferred embodiment is a 2 inch pin, is positioned somewhat forwardly of the pivot axis of the fifth wheel support member as shown in FIG. 10. This design shifts the weight of the hauled vehicle toward the inside of a curve to counteract centrifugal forces when the towing vehicle negotiates a turn as described above. The forward edges 156 and 159 of the jaws 154 and 158 resectively are inwardly tapered as shown in FIGS. 8 and 10. This allows the kingpin to force the jaws open slightly during coupling when the jaws are unlocked, thereby allowing the kingpin to seat against the aperture 162 of engaging plate 160. Transverse plate 164 is positioned adjacent the forward wall 122 of the support member 120 and extends across the slot 114 above the tapered walls 111a and 111b of the forward segments to provide structural support for the open throat of the fifth wheel. The jaws are releasably held in a cocked position by latching means which is automatically released to lock the kingpin within jaws 154 and 158. A discussion of the latching means and triggering mechanism therefor follows.

Coupled to the jaw 158 in a pivotable fashion is one end 165 of a lever arm 166. The center 167 of the lever arm is coupled in a pivotable fashion to one end of linkage 163 having an opposite end 169 pivotally coupled to the fixed engaging plate 160. The opposite end 168 of lever arm 160 is attached to one end 172 of a reinforced cross arm 170. The opposite end 174 of cross arm 170 is pivotally coupled to the opposite jaw 154. An actuation arm 180 has one end also coupled to jaw 154 and extends outwardly between wall 126 of the support member 120 and the mounting bracket 130. Arm 180 is actuated as described below by a control handle 175 which extends through an enlarged aperture 182 in the actuation arm 180.

Figures 6, 9:
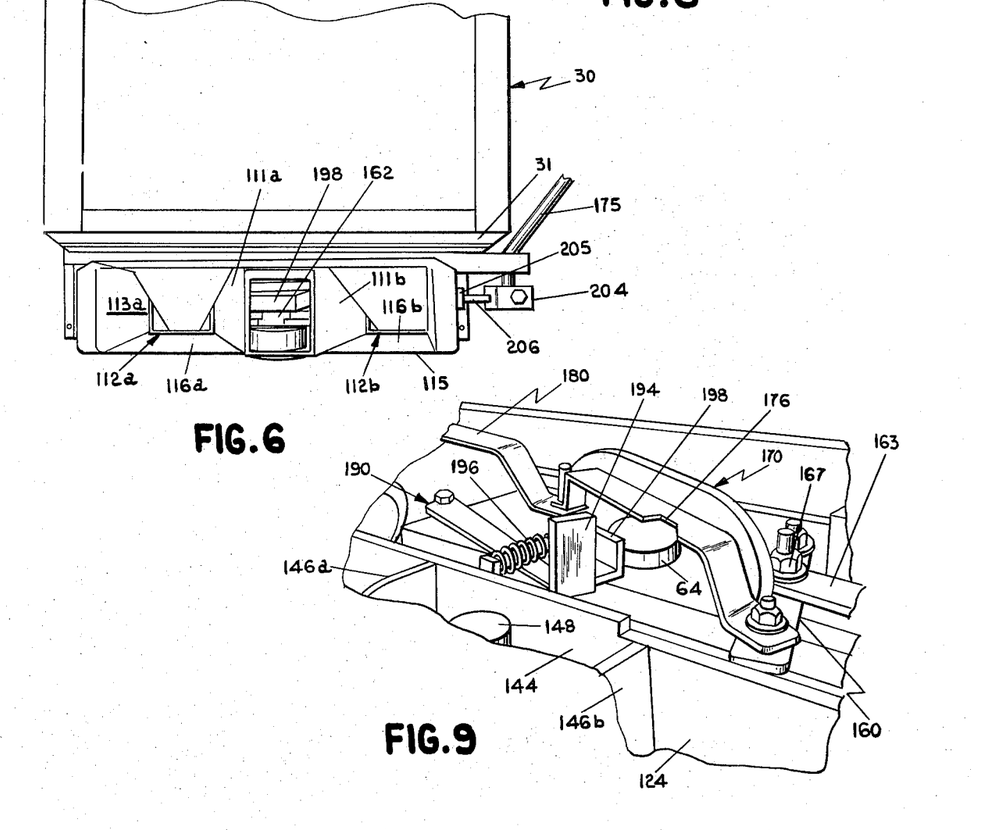
FIG. 6 is a fragmentary front elevation view of the fifth wheel assembly shown with the locking jaws in an unlocked kingpin receiving position and illustrating the position of the kingpin trip plate.
FIG. 9 is a detail fragmentary rear perspective view of the kingpin tripping mechanism shown in the released position with the kingpin held in a locked position by the jaws of the fifth wheel.

A kingpin trip arm 190 has one end 192 pivotally coupled to the engaging plate 160 (FIGS. 8 and 10) and the opposite end 194 upwardly turned to form a latch which is adapted to fit in a notch 176 formed in cross arm 170. The trip arm is biased toward the cross arm by means of a spring 196 extending between a stud 123 on the inside of the rear wall 124 and a trip plate 198 forming an integral part of the trip arm 190. As seen in FIGS. 6 and 9, the trip plate is rectangular in shape and is positioned slightly above the locking jaws 154 and 158 to engage the widened portion 64 (FIG. 12) of the kingpin 60 as it enters the aperture 162 in the engaging plate 160. The operation of the tripping mechanism will be described in detail below.

Figures 2, 11:
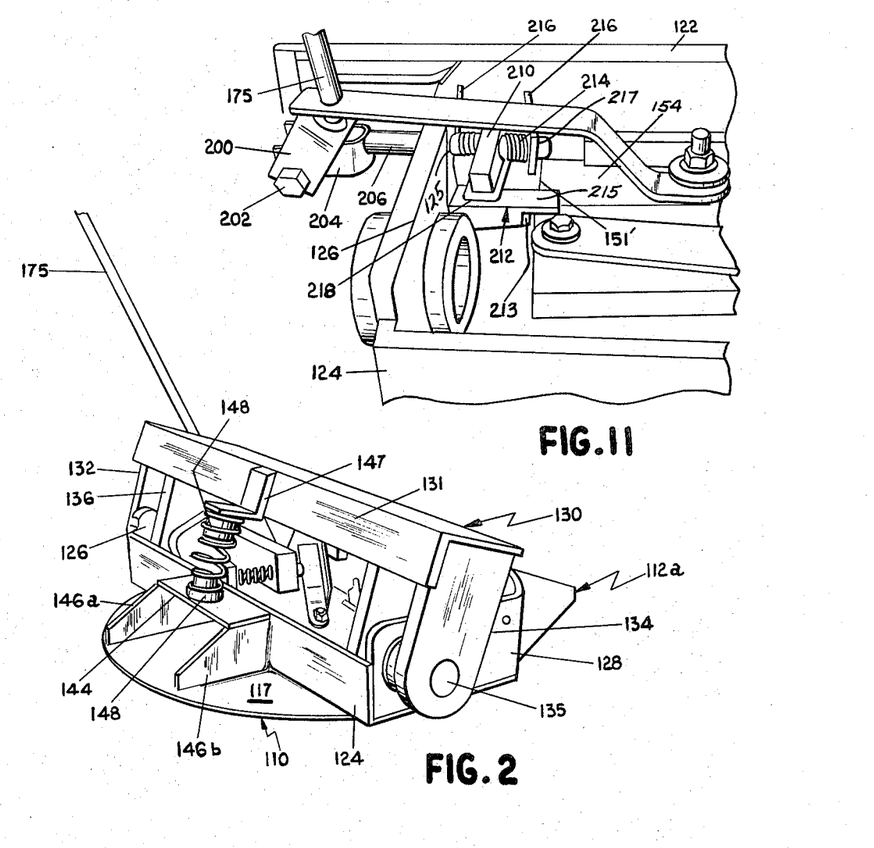
FIG. 2 is a rear perspective view of the inverted fifth wheel together with the mounting bracket therefor.
FIG. 11 is a detail fragmentary rear perspective view of the safety lock mechanism which is mechanically coupled to the control handle.
Figure 3:
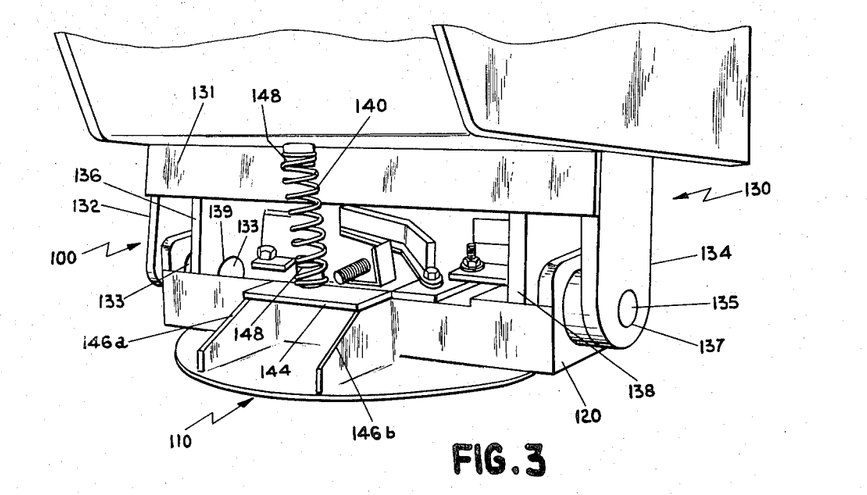
FIG. 3 is a fragmentary rear perspective view of the fifth wheel shown mounted to a fifth wheel mounting box attached to the front end of the trailer.
Figure 4:
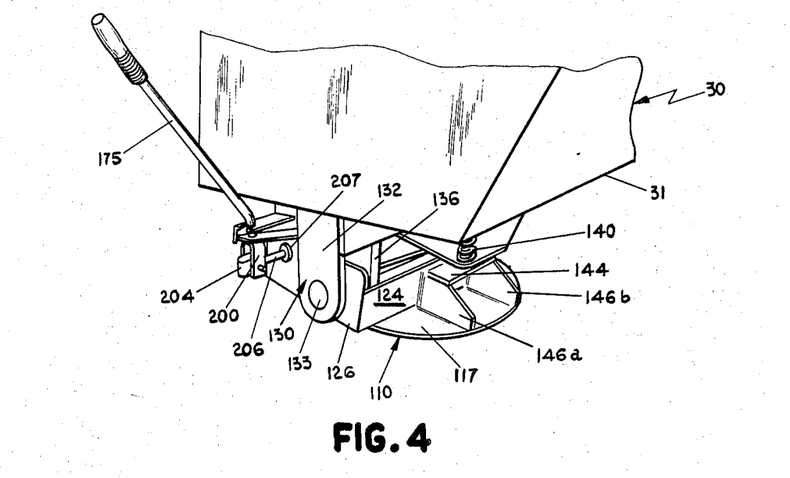
FIG. 4 is a fragmentary rear perspective view of the side of the fifth wheel opposite that shown in FIG. 3 and showing the control handle which is accessible from the outside of the pickup truck bed on the driver's side.

As seen in FIG. 11, the control arm 175 extends through the aperture 182 in the actuation arm 180 to a U-shaped member 200. U-shaped member 200 is coupled to a second U-shaped member 204 by means of a bolt 202 extending through the four legs of the two U-shaped members. Arm 175 is therefore pivotally coupled to a rod 206 joined to member 204 and which extends through an aperture 125 of side wall 126. A collar 207 (FIG. 4) fixedly secured to rod 206 limits its motion inwardly. Rod 206 is rotatably mounted within the aperture 125 and has a spring-loaded arm 210 fixedly secured to the end of rod 206 between a support member 217 and wall 126.

A locking plate 212 is welded or otherwise secured to the end of the arm 210 and biased downwardly by means of a bias spring 214 having ends 216 which contact the inner surface of front wall 122 and an opposite end 218 which fits over the arm 210 and contacts the top surface 215 of the locking plate 212. The locking plate has a notch 213 therein which is adapted to fit over the edge 151' of the locking jaw 154. Spring 214 pivots the locking plate downwardly thereby wedging the locking plate 212 between jaw 154 and the inner surface of side wall 126 when the jaws are in a locked position. In this locked position therefore, the jaws cannot be moved until the control rod 175 is pivoted forwardly and the locking plate 212 clears jaw 154. To hold the locking plate in an unlocked position for coupling, an angle iron arm 220 (FIGS. 10 and 11) is provided which extends from wall 122 and has an arm receiving notch 222 at the end thereof such that the control handle can be moved outwardly and forwardly to be positioned in the notch 222.

Figure 13:
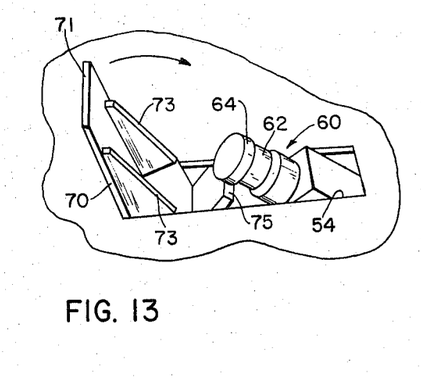
FIG. 13 is a perspective view of the fold-away kingpin assembly shown in a partially closed position.
Figure 14:
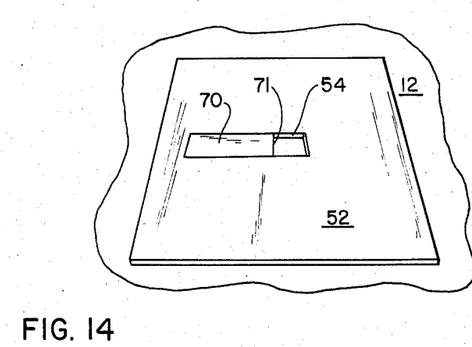
FIG. 14 is a perspective view of the fold-away kingpin mechanism shown in the fully closed, stored position.

The fold-away kingpin assembly 50 preferably used in this assembly, is shown in FIGS. 12, 13 and 14. It comprises a mounting plate 52 to which is pivotally mounted, within an aperture 54 therein, a kingpin 60. The kingpin is held in a locked, rigid upright position as illustrated in FIG. 12 by means of a locking plate 70 pivotally mounted within aperture 54 and which has an edge 71 that abuts an adjacent edge 61 on the pivotable kingpin. As seen in FIG. 13 which shows the kingpin in a partially raised position, the locking plate 70 includes a pair of support ribs 73 and a shoulder portion 75 which contacts the kingpin 60 to aid in raising the kingpin. The plate 70 is raised to unlock the raised kingpin or raise the stored kingpin, to allow the kingpin to be stored or raised. The detailed construction of the kingpin assembly 50 is presented in the concurrently filed application identified above and incorporated herein by reference.

Having described the fifth wheel assembly, a description of a cycle of coupling and decoupling operation will now be presented such that the operation of the the mechanism embodied in the fifth wheel assembly can be more fully understood. The fifth wheel locking mechanism has a cocked position as shown in FIG. 8 in which the handle 175 has first been rotated forward (arrow A, FIG. 10) to disengage the locking plate 212 from the jaws 154 such that next the handle can be moved outwardly in a direction indicated by the arrow B in FIG. 8 to pull the jaws outwardly by means of the actuation arm 180, the cross arm 170, the lever arm 166, and link 163. As the jaws are moved outwardly, the notch 176 in the cross arm 170 moves rearwardly and to the left until the latch 194 on the trip arm 190 engages the notch thereby holding the cross arm in a fixed position corresponding to a cocked, partially open jaw position as illustrated in FIG. 8. This position is securely held by means of the notch-latch combination together with the force of the compression spring 151 which tends to force the cross arm to the right.

In this cocked position illustrated in FIG. 8, the fifth wheel is ready to be coupled to the kingpin and the truck can be backed against the trailer until, as shown in FIG. 7, the kingpin contacts the tapered forward edges 156 and 159 (FIG. 8) of the jaws forcing them outwardly against spring 151 to allow the kingpin to pass rearwardly between the jaws until the annular recess 62 seats against the semicircular aperture 162 in the engaging plate 160. Simultaneously, as this occurs, the crown portion 64 of the kingpin contacts the trip plate 198 as seen in FIG. 9 thereby moving trip arm 190 rearwardly and releasing the latching mechanism to allow the compression spring 151 to securely snap the jaws into their interengaged relationship as shown in FIG. 10.

It is noted here that when in the cocked position as shown in FIG. 8, the handle can be positioned in the notch 222 of arm 220. As the kingpin forces the jaws to a fully opened position, the handle is initially pushed outwardly since, as the jaws are forced outwardly by the kingpin, the cross arm will move to the left thereby forcing the arm outwardly by means of the movement of actuation arm 180. Spring 216 (FIG. 11) will then cause the control handle 175 to rotate downwardly out of the notch 222 such that once the kingpin has cleared the jaws and is seated against the engaging plate 162 and trips the trip arm 190, the jaws will snap shut into their locked position and the locking plate 212 will rotate behind the edge 151 of the locking jaw 154 as shown in FIG. 11 to securely lock the kingpin within the jaws of the fifth wheel.

To uncouple the apparatus using the single control handle 175 which extends above the pickup truck bed and is easily accessible from outside the truck since it extends upwardly and away from the fifth wheel assembly; it is only necessary to first rotate the control handle in a forward direction indicated by the arrow A in FIG. 10 to raise the locking plate 212 from the edge 151' of jaw 154; then pull the arm to the left as indicated by the arrow B in FIG. 8 and position the control arm 175 in the notch 222. In this position, the kingpin will still be in contact with the trip plate 198 and the latch 194 will not be in the notch 176 of the cross arm.

As the truck is pulled away from the trailer however, the trip arm 190 will be allowed to move against the cross arm 170 when the kingpin moves away from the seat 162 in plate 160. The latch 194 on the trip arm will catch the notch 176 on the cross arm as the jaws close after the kingpin leaves the jaws, thereby holding the jaws in the cocked position shown in FIG. 8. At the same time, the handle 175 becomes disengaged from slot 222 in the same manner as in the locking operation. In this cocked position, the locking plate 212 will not be engaged with the edge of the jaws and it is not necessary to move the handle into slot 222 to hitch the trailer to the truck once the initial hitch-up and decoupling has been made.

When the trailer is to be recoupled to the towing vehicle, the cycle is repeated to automatically lock the kingpin into position between the locking jaws. It is noted that if the kingpin is too low, it will not engage the trip plate 198 and the jaws will not be released from the cocked position and no false coupling will be effected. Thus, the kingpin will simply pull forward out of the jaws, no coupling being achieved unless the kingpin enters the fifth wheel at the proper height and the crown portion 64 of the kingpin contacts a trip plate 198 of the fifth wheel.

It will become apparent to those skilled in the art that various modifications can be made to the fifth wheel assembly without departing from the spirit or the scope of the present invention as defined in the appended claims.

What is claimed is:

1. A fifth wheel coupler mounted to a first vehicle for coupling said first vehicle to a second vehicle, said coupler comprising:
    a fifth wheel plate having a face surface for slidable contact with the second vehicle, a pair of frontal segments defining a kingpin receiving slot, and an opposite surface;
    kingpin locking jaws mounted to said fifth wheel plate and movable toward and away from each other to alternately close for securing a kingpin therein and open for releasing a kingpin;
    bias means coupled to at least one of said locking jaws for urging said locking jaws toward an interengaged locking position;
    means including a control arm and latch coupled to said jaws, said control arm movable to a first position whereupon said latch operates for cocking said locking jaws in a kingpin receiving position resisting said bias means, said latch responsive to the presence of a seated kingpin, to release said jaws permitting said bias means to force said jaws into a position to lock said kingpin in said fifth wheel; and
    movable jaw locking means coupled to said control arm and biased to move to a jaw engaging position and move said control arm to a second position when said jaws are in position to lock said jaws in a kingpin locking position, said control arm movable to said first position to permit said kingpin to be withdrawn from said fifth wheel.

2. An inverted fifth wheel coupler for mounting to a first vehicle for coupling said first vehicle to a second vehicle, said coupler comprising:
    a fifth wheel plate having a face surface for slidable contact with the second vehicle, a pair of frontal segments defining a kingpin receiving slot, and an opposite surface;
    a kingpin locking mechanism positioned between and rearwardly of said pair of frontal segments and adjacent said opposite surface of said plate, said kingpin locking mechanism including a pair of locking jaws slidably mounted to said opposite surface of said fifth wheel plate and movable toward and away from each other to alternately close in an interengaged position and open;
    control means for cocking said locking mechanism in a kingpin receiving position and for actuating said locking mechanism in response to the presence of a seated kingpin, to lock said kingpin in said fifth wheel, wherein said control means includes means for releasably latching said jaws in an open position, said releasable latching means including a cross arm having one end coupled to one of said jaws and the other end coupled to the other of said jaws to provide simultaneous movement of said jaws in opposite directions, said cross arm including a latch receiving notch;
    bias means forcing said jaws toward a closed position;
    a latch movably positioned to engage said notch in said cross arm to hold said jaws in an open position resisting said bias means; and
    means for mounting said fifth wheel in an inverted position to a first vehicle with said face surface of said fifth wheel positioned below said opposite surface.

3. The apparatus as defined in claim 2 wherein said control means further includes: triggering means coupled to said latch and positioned to be contacted by a kingpin when the kingpin is properly positioned for locking to said fifth wheel to move said latch out of said notch thereby allowing said jaws to close under the influence of said bias means.

4. The apparatus as defined in claim 3 and further including a control arm coupled to said jaws for opening said jaws.

5. The apparatus as defined in claim 4 and further including jaw locking means coupled to said control arm and movably biased to contact said jaws to prevent movement of said jaws when closed, said locking means movable to an unlocked position by moving said control arm to a jaw unlocking position.

6. The apparatus as defined in claim 5 wherein said mounting means includes a mounting bracket, and means for pivotally coupling said mounting bracket to said fifth wheel plate to allow said fifth wheel to articulate with respect to the first vehicle.

7. A fifth wheel assembly for positioning on a first vehicle for coupling said first vehicle to a second vehicle having a kingpin positioned thereon comprising:
    a bifurcated plate having a pair of frontal segments defining a rearwardly-inwardly tapered slot therebetween for guideably receiving a kingpin;
    a pair of kingpin locking jaws slidably attached to said plate and movable generally transversely to the longitudinal axis of said slot toward and away from each other, said locking jaws having end portions which interengage to circumscribe at least a portion of a kingpin when the jaws are moved toward and adjacent each other;

an engaging plate positioned rearwardly and adjacent said jaws from said frontal segments, said plate including a kingpin receiving surface thereon for holding said kingpin between said plate and said jaws when said jaws are in an interengaging position;

means for biasing said jaws in a closed position;

releaseable latching means for holding said jaws in an open position resisting said biasing means, said latching means includes a cross arm and pivot means interconnecting said jaws for simultaneously moving said jaws in opposite directions when one jaw is moved, and a control arm coupled to one of said jaws and movable for opening said jaws; and tripping means positioned to be contacted by a kingpin for releasing said latching means when the kingpin is moved into engagement with said kingpin receiving surface thereby causing said jaws to close to a kingpin locking position.

8. The apparatus as defined in claim 7 and further including locking means for automatically locking said jaws in a closed position when a kingpin contacts said tripping means.

9. A fifth wheel assembly for positioning on a first vehicle for coupling said first vehicle to a second vehicle having a kingpin positioned thereon comprising:

a bifurcated plate having a pair of frontal segments defining a rearwardly-inwardly tapered slot therebetween for guideably receiving a kingpin;

a pair of kingpin locking jaws slidably attached to said plate and movable generally transversely to the longitudinal axis of said slot toward and away from each other, said locking jaws having end portions which interengage to circumscribe at least a portion of a kingpin when the jaws are moved toward and adjacent each other;

an engaging plate positioned rearwardly and adjacent said jaws from said frontal segments, said plate including a kingpin receiving surface thereon for holding said kingpin between said plate and said jaws when said jaws are in an interengaging position;

means for biasing said jaws in a closed position;

releasable latching means for holding said jaws in an open position resisting said biasing means;

tripping means positioned to be contacted by a kingpin for releasing said latching means when the kingpin is moved into engagement with said kingpin receiving surface thereby causing said jaws to close to a kingpin locking position; and locking means for automatically locking said jaws in a closed position when a kingpin contacts said tripping means, said locking means including a support member positioned on said bifurcated plate, a locking plate pivotally mounted to said bifurcated plate at one end of one of said locking jaws and positioned to be moved between said end of said jaw and said support member when said jaw is in a closed position thereby preventing opening of said jaw, bias means holding said locking plate against said jaw, and control means for pivoting said locking plate away from said jaw.

10. The apparatus as defined in claim 9 wherein said control means includes:

a control arm coupled to said locking plate; and an actuation arm coupled between said control arm and one of said jaws such that said control arm can be moved to unlock and open said jaws.

11. A kingpin locking assembly to be mounted to a first vehicle for coupling said first vehicle to a second vehicle having a kingpin positioned thereon comprising:

a bifurcated plate having an inwardly tapered slot therein adapted to guideably receive a kingpin;

a pair of opposed locking jaws slidably positioned on said plate and movable generally transversely to the longitudinal axis of said slot between a closed kingpin holding position and an open kingpin releasing position;

means for biasing said jaws in a closed position;

a control arm and means coupling said control arm to said jaws for opening said jaws;

releaseable latching means for holding said jaws in an open position resisting said biasing means;

tripping means coupled to said latching means and positioned to be contacted by a kingpin when the kingpin is positioned between said jaws for releasing said latching means thereby causing said jaws to close into a kingpin locking position; and locking means coupled to said control arm for releasably locking said jaws when in a kingpin locking position.

12. A kingpin locking assembly to be mounted to a first vehicle for coupling said first vehicle to a second vehicle having a kingpin positioned thereon comprising:

a bifurcated plate having an inwardly tapered slot therein adapted to guideably receive a kingpin;

a pair of locking jaws slidably positioned on said plate and movable generally transversely to the longitudinal axis of said slot between a closed kingpin holding position and an open kingpin releasing position;

means for biasing said jaws in a closed position;

releaseable latching means for holding said jaws in an open position resisting said biasing means, said latching means includes a cross arm and pivot means interconnecting said jaws for simultaneously moving said jaws in opposite directions when one jaw is moved, and a control arm coupled to one of said jaws and movable for opening said jaws;

tripping means positioned to be contacted by a kingpin when the kingpin is positioned within said jaws for releasing said latching means thereby causing said jaws to close into a kingpin locking position; and locking means for releaseably locking said jaws in a closed position.

13. The apparatus as defined in claim 12 wherein said cross arm includes a notch therein and wherein said latching means includes an arm coupled to said tripping means and having a latch at one end thereof, and bias means holding said tripping arm in contact with said cross arm such that as said jaws are opened by said control arm said latch snaps into said notch of said cross arm holding said jaws in an at least partially opened position.

14. The apparatus as defined in claim 13 and further including:

a kingpin engaging plate positioned rearwardly of said jaws, said plate including a kingpin receiving aperture therein; and said tripping means comprising a trip plate positioned on said tripping arm and extending over and above said kingpin receiving aperture of said kingpin engaging plate such that as said kingpin enters said fifth wheel, it contacts said trip plate to move said tripping arm and said latch thereon away from said notch in said cross arm to release said jaws.

15. The apparatus as defined in claim 14 wherein a support member is positioned in spaced relationship to an end of at least one jaw and wherein said locking means comprises a locking plate coupled to a rod coupled to said control arm for pivoting movement between said support member and said end of said jaw to lock said jaws in a closed position and above said jaw to allow said jaws to be opened by said control arm.

16. The apparatus as defined in claim 15 and further includes bias means holding said locking plate in a downward position toward said jaw.

* * * * *